[21.] Hiram Pitcher.
Comb'd Auger, Reamer and Core Auger.

No. 118,552.

Patented Aug. 29, 1871.

Witnesses:
E. Wolff
Wm. H. C. Smith.

Inventor:
Hiram Pitcher.
PER Munn & Co
Attorneys.

UNITED STATES PATENT OFFICE.

HIRAM PITCHER, OF FOND DU LAC, WISCONSIN, ASSIGNOR TO HIMSELF AND H. & G. O. TROWBRIDGE, OF SAME PLACE.

IMPROVEMENT IN AUGERS.

Specification forming part of Letters Patent No. 118,552, dated August 29, 1871.

*To all whom it may concern:*

Be it known that I, HIRAM PITCHER, of Fond du Lac, in the county of Fond du Lac and State of Wisconsin, have invented a new and useful Improvement in Combined Auger, Reamer, and Core-Auger; and I do hereby declare that the following is a full, clear, and exact description thereof, which will enable others skilled in the art to make and use the same, reference being had to the accompanying drawing forming part of this specification, in which—

Figure 1:
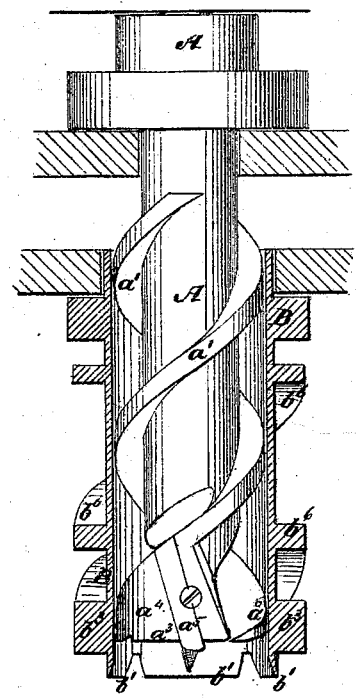
Figure 2:
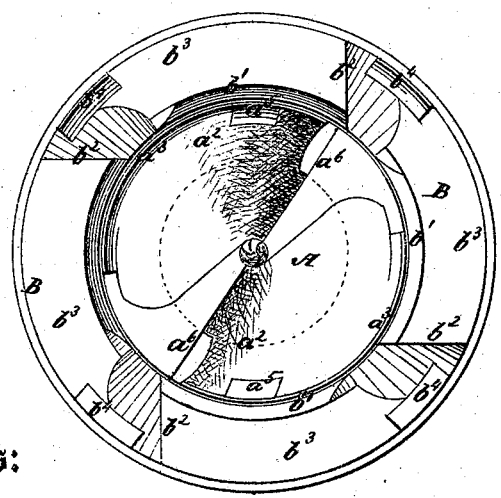

Figure 1 is a side view of my improved tool, partly in section, through the reamer. Fig. 2 is a front-end view of the same.

Similar letters of reference indicate corresponding parts.

My invention has for its object to furnish an improved combined auger, reamer, and core-auger, which shall be so constructed and arranged that the two parts may be used together or separately, as may be desired, or as circumstances may require, and which shall be simple in construction and effective in operation; and it consists in the construction and combination of various parts of the tool, as hereinafter more fully described.

A is the shank of the auger, which works in bearings and guides, and is driven in the ordinary manner. The stem or shank A is made with a spiral thread, $a^1$, in the ordinary manner. The forward end of the auger A is reamed out, or has recesses $a^2$ formed in it to form a spur-edge, $a^3$, upon its periphery, for a guide to the auger while boring, and to prevent the auger from turning to one side. The spaces between the lips are also filled up with metal $a^4$, leaving the space for the chips to pass through, small, to prevent the chips from coming off when the auger is being withdrawn. The metal $a^4$ also provides a seat for the spur-cutters $a^5$, which can thus be placed forward of and quite close to the cutting-lips $a^6$. B is the reamer, which is made hollow, and of such a size as to fit upon the auger A. The reamer B may be driven by a pulley independently of the auger A, or it may be so connected with said auger A as to be carried with it in its revolution. The hollow cylinder of the reamer B is made with any desired number of spur-cutters $b^1$ around the inner edge of its forward end, to serve as a guide to the tool when used as a reamer, and to separate the central core from the surrounding wood when used as a core-auger. The forward end of the reamer is also provided with any number of cutting-lips $b^2$. The spaces between the lips $b^2$ are filled with metal, $b^3$, to make the spaces for the chips to pass through, small, to form a greater bearing-surface upon the periphery of the reamer, and also to form a seat for the cutting spur-cutters $b^4$, which can thus be placed forward of and close to the cutting-lips $b^2$. The spurs $a^5$ and $b^4$ are secured in their seats by set-screws, so that they may be set to cut forward to any desired distance. The reamer B is provided upon its outer surface with a spiral thread, $b^6$, in the usual manner.

By this construction the inner auger A may be used alone or in connection with the outer auger or reamer B. The outer auger B may be used alone to ream a hole, or as a core-auger; or it may be used in connection with the auger A to ream a hole as it is bored.

Having thus described my invention, I claim as new and desire to secure by Letters Patent—

1. The cutting-spur $b^1$, constructed and arranged as and for the purpose specified.

2. A double auger, formed of the parts A B, each spirally flanged, arranged one within the other, and provided with cutters, as specified.

HIRAM PITCHER.

Witnesses:
GEORGE T. TROWBRIDGE,
HENRY BOWMANN.